Figure 1A:
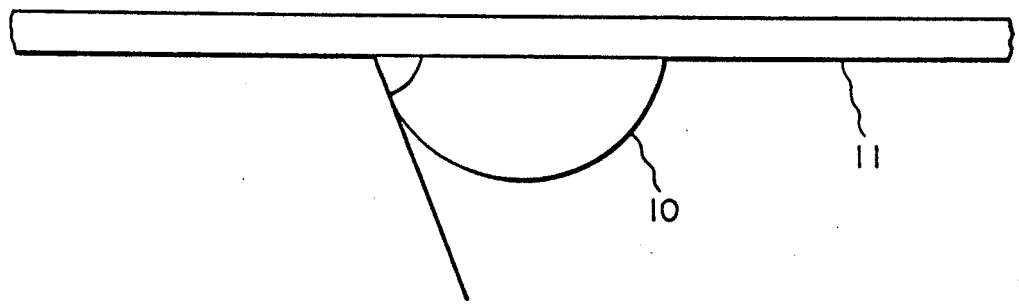

United States Patent [19]

Patel

[11] Patent Number: 4,994,318
[45] Date of Patent: Feb. 19, 1991

[54] THERMOPLASTIC SUBSTRATES HAVING IMPROVED WATER SPREADING CHARACTERISTICS

[75] Inventor: Gautam A. Patel, Clifton Park, N.Y.

[73] Assignee: General Electric Company, Schenectady, N.Y.

[21] Appl. No.: 297,276

[22] Filed: Jan. 17, 1989

[51] Int. Cl.⁵ .................................................. B32B 5/16
[52] U.S. Cl. .................................. 428/331; 428/336; 428/412; 428/913; 428/451; 428/701
[58] Field of Search ............... 428/708, 331, 412, 913, 428/336, 451

[56] References Cited

U.S. PATENT DOCUMENTS 4,576,864 3/1986 Krautter et al. ..................... 428/328

FOREIGN PATENT DOCUMENTS 51-006193 1/1976 Japan .

Primary Examiner—P. C. Sluby
Attorney, Agent, or Firm—William A. Teoli; James C. Davis, Jr.; William H. Pittman

[57] ABSTRACT

Thermoplastic substrates such as structured sheet and film can be made having enhanced water spreading characteristics, by solvent impregnation or treatment with colloidal silica containing coating compositions which also can contain an acrylic resin.

12 Claims, 2 Drawing Sheets

THERMOPLASTIC SUBSTRATES HAVING IMPROVED WATER SPREADING CHARACTERISTICS

BACKGROUND OF THE INVENTION

The present invention relates to certain thermoplastic substrates, such as polycarbonates and polymethylmethacrylates, as well as glazing materials having improved water spreading characteristics. More particularly, the present invention relates to the impregnation of the surface of a thermoplastic substrate with a colloidal inorganic oxide, or by the use of an organic solvent coating composition in the form of a blend of an acrylic resin and a colloidal inorganic oxide whereby improved water wetting and water spreading characteristics are imparted to the treated substrate surface.

Prior to the present invention, as shown by Krautter et al., U.S. Pat. No. 4,576,864, a method for treating plastic material, such as a glazing material to improve its water spreading characteristics was provided by initially treating the plastic substrate with an adhesive layer of a non-water soluble and an essentially non-swellable polymer containing at least one polar group. For example, butyl methacrylate can be mixed with a methyl methacrylate, glycidyl methacrylate and methacrylic acid. After the adhesive layer had dried, there was applied a colloidal inorganic oxide, such as anionic aqueous silicic sol modified with aluminum oxide. The treated substrate was then dried for 5 minutes at temperatures up to about 80° C. Although the method of Krautter et al. provides treated plastic substrates having improved wettability and water spreading characteristics, it requires a multi-step procedure which often is inconvenient convenient if a high production rate is to be maintained during a commercial operation.

An anti-dimming coating for transparent synthetic resin articles is shown in J.P.A. No. 7606193. A mixture of a colloidal silica and alumina in combination with a dispersion or emulsion of a hydrophobic acrylic resin is used to treat the surface of a transparent synthetic resin film. It is reported, however, that adhesion of the coating is completely unsatisfactory, particularly when moistened.

It would be desirable, therefore, to provide thermoplastic substrates having improved wetting characteristics and water spreading characteristics in accordance with methods which would not require multi-step procedures and which would provide coatings on thermoplastic substrates having a satisfactory degree of adhesion.

The present invention is based on the discovery that improved water spreading and wetting characteristics can be imparted to thermoplastic substrates, such as a polycarbonate substrate or a polymethylmethacrylate substrate, if treated with an organic solvent coating composition of an acrylic resin and a colloidal inorganic oxide, such as colloidal silica, as defined hereinafter. Although a heating of the treated substrate until dry is required, no prior application of an adhesive layer is needed. The adhesion of the resulting applied coating to the thermoplastic substrate also has been found to be satisfactory. It also has been discovered that direct impregnation of the surface of the thermoplastic substrate, such as a polycarbonate or polymethylmethacrylate, can be achieved by the use of a mixture of a strong solvent, such as diacetone alcohol, and a colloidal inorganic oxide, such as colloidal silica. The surface of the treated thermoplastic substrate is then dried at elevated temperatures. Although the treated thermoplastic substrates have been found to have enhanced water wetting characteristics and water spreadability, novel properties can also be imparted to the plastic substrate by using different metal oxide colloids, e.g., conduction or antistatic properties with colloidal tin oxide, UV absorbing property with colloidal titanium dioxide, flame retardancy with colloidal antimony oxide and antireflection properties with colloidal silica and alumina.

STATEMENT OF THE INVENTION

There is provided by the present invention, a substantially transparent thermoplastic substrate exhibiting improved water wetting and water spreading characteristics resulting from the treatment of the thermoplastic substrate with an organic solvent coating composition selected from the class consisting of (A) a coating composition of organic solvent and from 1% to 10% solids of a mixture consisting essentially of by weight 3 to 50 parts of an acrylic resin, per 100 parts of a colloidal inorganic oxide having an average particle size of from 4 to 60 nanometers and, and (B) a coating composition having 0.1 to 2 parts by weight of a colloidal inorganic oxide, per 100 parts of organic solvent.

Figure 2A:
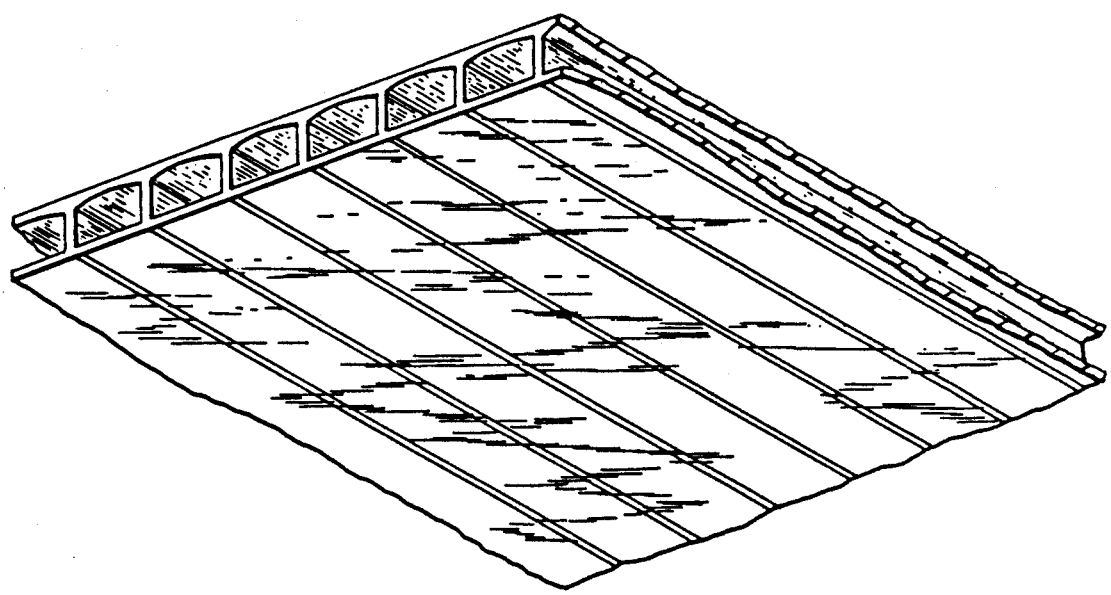

The term "thermoplastic substrate" as used in the description of the present invention, means sheet having a thickness of 1/16" to ½" thick, film having a thickness of 30 mils or less and structured sheet as shown by FIG. 2.

Some of the substantially transparent thermoplastic substrate which can be utilized in the practice of the present invention include, for example, LEXAN polycarbonate, ULTEM polyetherimide, VALOX polyester, which are thermoplastics manufactured by the General Electric Company, Mylar polyester and, in particular instances, polyethylene and polypropylene sheet.

Some of the polyacrylic polymers which can be used in the practice of the invention are polymethyl methacrylate and its copolymers, polyethyl methacrylate and its copolymers and polybutyl methacrylate and its copolymers. These materials are available as Elvacite ® acrylic resins from the DuPont de Nemours Company. These binders are thermoplastic and soluble in organic solvents. In addition, a copolymer may contain a functional group or groups such as hydroxyl, carboxylic or glycidyl which can be further crosslinked by using a suitable crosslinking agent, such as melamine formaldehyde resin. The binder system is not limited only to acrylics. Polyurethanes and polyvinyl chloride and its copolymers also can be used.

Another class of acrylic resins are water soluble and dispersible in a water-based system. This class of materials, both thermoplastic and thermosetting, are available as Carboset ® resins from B.F. Goodrich Company.

Another essential ingredient of the organic solvent coating composition used in the practice of the present invention is the colloidal inorganic oxide which can include colloidal metal oxides, such as alumina, antimony oxide, tin oxide, titanium dioxide, cerium oxide, silica and mixtures thereof. Colloidal silica is preferred having an average diameter of about 4 nm to about 60 nm.. Colloidal silica is a dispersion of submicron-size silica ($SiO_2$) particles in an aqueous or other organic solvent medium. Dispersions of colloidal silica are available from chemical manufacturers such as DuPont de Nemours Company and Nalco Chemical Company. Colloidal silica is available in either acidic or basic form. Alkaline colloidal silica can be converted to acidic colloidal silica with acids, such as HCl or $H_2SO_4$ along with high agitation.

An example of a satisfactory colloidal silica for use in these coating compositions is Nalcoag 1034A, available from Nalco Chemical Company, Chicago, Ill. Nalcoag 1034A is a high purity, acidic pH aqueous colloidal silica dispersion having a low $Na_2O$ content, a pH of approximately 3.1 and an $SiO_2$ content of approximately 34 percent by weight in water. Another type of colloidal silica is Ludox AM available from DuPont de Nemours Company, where the colloidal silica surface is modified with aluminum oxide.

Another preferred source of colloidal silica is an organosol available as a 30 wt % $SiO_2$ of 20 nm average diameter in ethylene glycol monopropyl ether solvent from Nalco Chemical Company. This product is known as 84SS 258. Organosols can also be prepared in other alcohol or glycol ether type or dimethylformamide solvent. Both organosols and aquasols can be used as a source of colloidal silica in this system.

Organic solvents which can be used in the solvent or organic coating composition of the present invention are, for example, isoamyl alcohol, cyclohexanol, 2-ethylhexanol, ethylene glycol, propylene glycol, ethylene glycol ethyl ether, ethylene glycol butyl ether, propylene glycol methyl ether, propylene glycol propyl ether, propylene glycol butyl ether, diethylene glycol methyl ether, dipropylene glycol methyl ether and tripropylene glycol methyl ether.

In addition to the above conventional solvents, there can be used strong polymer solvents or mixtures thereof with the aforementioned alcohols or glycol ethers. Strong solvents can be selected from a number of classes of materials, such as ketones, aromatic hydrocarbons, chlorohydrocarbons, esters, ethers, amides, etc. For example, methyl ethyl ketone, methyl isobutyl ketone, methyl amyl ketone, isophorone, diacetone alcohol, cyclohexanone, toluene, methylene chloride, glycol ether acetates, tetrahydrofuran, ethylene glycol methyl ether, carbitol (Union Carbide Corp.), propylene glycol methyl ether and dimethyl formamide.

The solvent blend should provide a right combination of polymer solubility, evaporation and processing characteristics. The solvent blend can consist of a blend of the conventional solvent and strong solvent having from 5 to 50% by weight of the strong solvent. The amount of strong solvent can be adjusted so that crazing or hazing of the thermoplastic substrate is minimized while providing optimum polymer solubility and evaporation characteristics.

In addition, optionally the coating composition may contain with small amounts of silane coupling agents or zirconia aluminum metallo organic complexes and nonionic surfactant or wetting agents.

In order that those skilled in the art will be better able to practice the present invention, reference is made to the drawings. There is shown at FIG. 1 side views at 1 (a), 1 (b) and 1 (c) of a thermoformable or thermoplastic substrate having a water droplet on its surface at various contact angles. In FIG. 2 there is shown an isometric view of a typical structured plastic sheet and a side view.

Figure 1B:
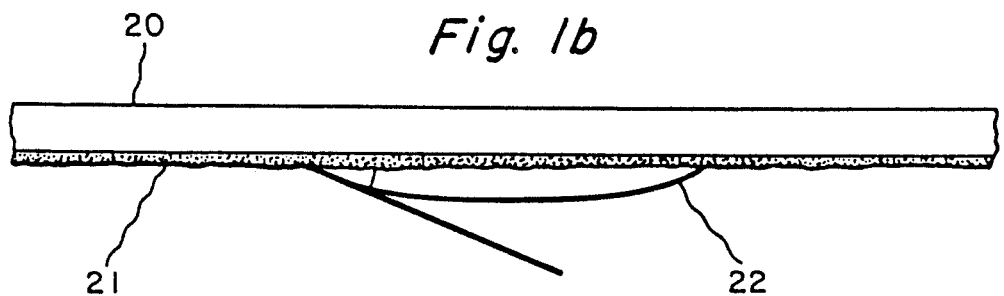
Figure 1C:
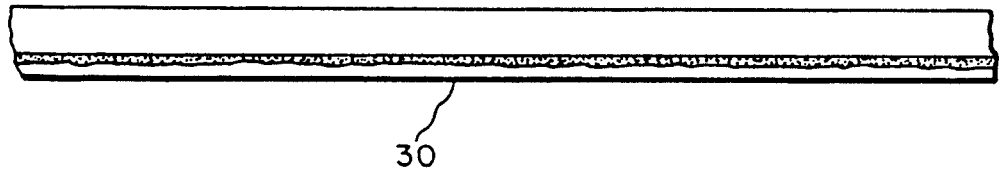
Figure 2B:
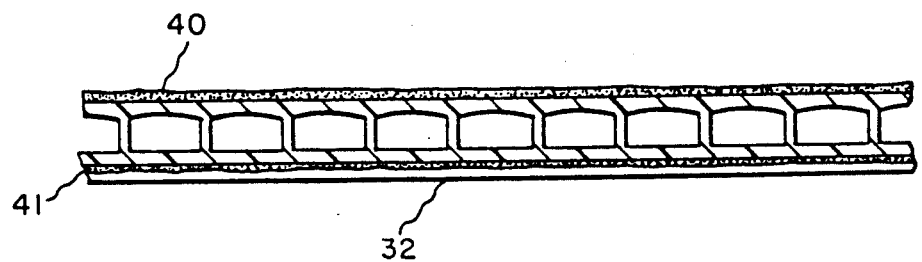

More particularly, there is shown at FIG. 1 (a) a water droplet at 10 on an untreated plastic sheet at 11. The droplet exhibits a high contact angle. In FIG. 1(b) there is shown a plastic substrate at 20 coated with a cured inorganic oxide-polyacrylate coating at 21 having a thickness of from about 0.01 to 1 micron in accordance with the practice of the invention, and a water droplet at a low contact angle at 22. In FIG. 1 (c) there is shown a water droplet at 30 which on a treated plastic substrate which has spread completely. FIG. 2b shows a UV absorbing layer at 40, an inorganic oxideacrylate coating at 41 and a water layer at 32.

In the practice of the method of the present invention, the thermoplastic sheet can be treated with the colloidal inorganic oxide by either solvent impregnation of the colloidal inorganic oxide or by the use of a colloidal inorganic oxide and polyacrylate blend which can be applied onto the surface of the thermoplastic sheet in the form of the organic solvent coating composition. After applying the inorganic oxide coating, the treated thermoplastic sheet can be allowed to air dry at room temperature followed by the heat drying in an air circulated oven for 5 to 20 minutes at temperatures in the range of from 90° C. to 130° C.

The thermoplastic sheet, which includes film and structured sheet as previously defined, also can be treated with the colloidal inorganic oxide and thereafter the treated substrate can be dried.

Treatment of the thermoplastic sheet can be effected by direct solvent impregnation of the thermoplastic sheet surface with the colloidal inorganic oxide, or the colloidal inorganic oxide can be applied as a colloidal inorganic oxide-acrylate coating. The colloidal inorganic oxide coating can have a thickness of about 0.01 micron to 1 micron and preferably 0.05 to 0.5 micron.

Treatment of the thermoplastic sheet or substrate can be achieved by typical means such as flow coating, spraying, roller coating, dipping or curtain coating.

Strong organic solvents, such as diacetone alcohol alone or in mixture with glycol ether solvents can be used to directly impregnate the thermoplastic substrate. Effective results can be achieved if there is used a solution having from about 0.1% to 2% by weight colloidal inorganic solids. After impregnation, the treated substrate can be heated to from 90° C. to 130° C. utilizing heating means such as an air circulating oven or an IR lamp bank.

In instances where an organic solvent coating composition of an inorganic oxide-acrylate mixture is used, a solids concentration of from 1% to 10% can be used having from 3 parts to 50 parts by weight of polyacrylate resin, per 100 parts of colloidal inorganic oxide. Baking temperatures in the range of from 90° C. to 130° C. can be employed using equipment as previously described.

A thermoplastic sheet treated in accordance with the practice of the invention can be used as roofing for greenhouses, skylights and arcades. In instances where film is used, improved sunglasses and ski goggles also are provided.

It has been found that the cured coating of colloidal silica and polyacrylate, as previously defined can contain from 65 to 95 weight % silica based on solids. It has been found that a contact angle of 20° or less requires greater than 80 weight % silica.

In order that those skilled in the art will be better able to practice the present invention, the following example is given by way of illustration and not by way of limitation. All parts are by weight.

EXAMPLE 1

Lexan polycarbonate sheets (6"×12"×⅛") was surface impregnated with organic solvent coating compositions containing 0.3 and 0.6 Phs (parts per hundred solvent) colloidal silica in diacetone alcohol, referred to hereinafter as coating composition A and B. The treated polycarbonate sheet was then allowed to air dry at room temperature for 2 to 3 minutes and then heat dried in an air circulated oven for 20 minutes at 126°. Colloidal silica sol 84SS258 consists of a 30 weight percent $SiO_2$ having an average diameter of 20 nm. in ethyleneglycol monopropyl ether which was obtained from the Nalco Chemical Company. Coating compositions C and D also were used which were obtained by mixing polymethylmethacrylate Elvacite 2041 (E.I. DuPont de Nemours Company) and its copolymer Elvacite 2014 which were mixed with colloidal silica in the same solvent medium. These coated Lexan polycarbonate sheets were also flow coated and dried in accordance with the same procedure. The following results were obtained.

TABLE 1

| Coating Compositions | A | B | C | D |
|---|---|---|---|---|
| (1) Diacetone alcohol (gms) | 100 | 100 | 100 | 100 |
| (2) Elvacite 2041 (3 pbw in 100 pbw Dowanol PM) (Polymethyl methacrylate) (gms) | — | — | 0.66 | — |
| (3) Elvacite 2014 (3 pbw in 100 pbw Dowanol PM) (PMMA copolymer, acid No. 13) (gms) | — | — | — | 0.66 |
| (4) 30% Colloidal Silica Organosol 84SS258 (gms) | 1.0 | 2.0 | 2.0 | 2.0 |
| Amount of Colloidal $SiO_2$ (phs, parts per hundred solvent) | 0.3 | 0.6 | — | — |
| Wt % $SiO_2$, based on solids | — | — | 97 | 97 |
| Contact angle of water, Φ°[1] | 22° | 14° | 12° | 17° |

[1]Contact angle of untreated Lexan sheet 75°

The above results show that improved contact angle of water was obtained on a Lexan polycarbonate sheet treated in accordance with the practice of the present invention as compared to an untreated Lexan polycarbonate sheet having a contact angle of 75°. It was also found that Lexan polycarbonate sheet treated with coating composition C continued to show a 12° contact angle after 31 days of continuous immersion in hot water at 165° C. indicating good adhesion and resistance to water.

EXAMPLE 2

Following in the procedure of Example 1, additional coating compositions (E, F, G and H) were prepared. The coating compositions had consisted of 75/25, 50/50 and 25/75 Pbw diacetone alcohol and Dowanol PM (Dow Chemical Company). These coating compositions were used to treat Lexan polycarbonate structured sheet, which is shown in FIG. 2. The following results were obtained.

TABLE 2

| Coating Compositions | E | F | G | I |
|---|---|---|---|---|
| Diacetone alcohol (gms) | 75 | 75 | 50 | 25 |
| Dowanol PM (gms) | 25 | 25 | 50 | 75 |
| Elvacite 2041 (3 pbw in 100 pbw Dowanol PM) (gms) | — | 1.2 | 1.2 | 1.2 |
| 30% Colloidal Silica- Organosol 84SS258 (gms) | 4.0 | 4.0 | 4.0 | 4.0 |
| Contact angle ($H_2O$), Φ°[1] | 27° | 20° | 17° | 14° |
| Φ° after 19 days of hot water immersion at 65° C. | 14° | 12° | — | — |

[1]Contact angle of untreated Lexan profiled sheet 75°.

The above results show that a significant reduction in contact angle was achieved using the coating composition of the present invention as compared to the contact angle of 75° on untreated structured Lexan polycarbonate sheet. It is further shown that the coating composition using diacetone alcohol Dowanol PM can be varied considerably without any significant effect on the contact angle. In addition, it was found that coating compositions E and F continued to show a contact angle of 12° and 14° after 19 days of continuous immersion in hot water at 65° C. In accordance with the procedure of Examples 1 and 2, a study was conducted to determine the effect of colloidal silica level and contact angle. The following results were obtained.

TABLE 3

| Coating Compositions | | | | | |
|---|---|---|---|---|---|
| Diacetone alcohol (gms) | 25 | 25 | 25 | 50 | 25 |
| Dowanol PM (gms) | 75 | 75 | 75 | 50 | 75 |
| Elvacite 2041 (3 pbw in 100 pbw Dowanol PM) (gms) | 15 | 10 | 7.5 | 3.6 | 1.2 |
| 30% Colloidal Silica- Organosol 84SS258 (gms) | 4.5 | 4.5 | 4.5 | 4.5 | 4.0 |
| Wt % $SiO_2$ based on solids | 75 | 82 | 86 | 92 | 97 |
| Contact angle of water, Φ° | 50 | 30 | 19 | 16 | 14 |

The above results show that an optimum level of weight percent $SiO_2$ based on solids is about 85 weight percent to provide a water contact angle of 20° or less. It was further found that other metal oxides such as tin oxide also can be used to reduce the contact angle of water. For example, one coating composition having solids containing 90 weight percent tin oxide and 10% Hycar (of the B.F. Goodrich Company) a thermoset acrylic polymer emulsion exhibited a

EXAMPLE 4

Following the procedure of Example 1, additional coating compositions were prepared which were used on Lexan polycarbonate structured sheet for the purpose of determining the degree of adhesion of the colloidal silica coating on the substrate. A Scotch tape adhesion test was used employing one inch wide 3M-610 tape which was applied to the treated Lexan polycarbonate after the coating was dried. The tape was then pulled and the substrate was washed with isopropanol and water and dried followed by measuring the contact angle. A substantial increase in the contact angle to about 1.5 to two times the initial value was considered a failure of the adhesion test. The following results were obtained where "+" indicates that no failure occurred when testing was discontinued.

TABLE 4

| | | | | | |
|---|---|---|---|---|---|
| Diacetone Alcohol (gms) | 75 | 75 | 75 | 25 | 25 |
| Dowanol PM (gms) | 25 | 25 | 25 | 75 | 75 |
| Elvacite 2041 (3 pbw in 100 pbw Dowanol PM) (gms) | — | 1.2 | 5.0 | 5.0 | 7.5 |
| 30% Colloidal Silica- | 4.0 | 4.0 | 4.5 | 4.5 | 4.5 |

TABLE 4-continued

| | | | | | |
|---|---|---|---|---|---|
| Organosol 84SS258 (gms) Wt % SiO$_2$ in the coating based on solids | — | 97 | 90 | 90 | 86 |
| Initial contact angle with water, Φ° | 19° | 14° | 19° | 19° | 19° |
| Initial tape adhesion | Pass | Pass | Pass | Pass | Pass |
| Tape adhesion after hot water immersion at 65° C., Number of days for failure | 3 | 14 | 14+ | 25 | 30+ |

The above results show that improved adhesion was obtained in instances where the coating composition contained Elvacite acrylic resin in combination with colloidal silica.

EXAMPLE 5

A coating composition was prepared using Nalcoag 2326 (Nalco Chemical Company) which is a 14.5% colloidal silica of 5 nanometer size in water. The colloidal silica sol was mixed with a mixture of Dowanol PM and diacetone alcohol. The following results show the coating composition and the results obtained.

TABLE 5

| | |
|---|---|
| Dowanol PM (gms) | 50 |
| Diacetone alcohol (gms) | 50 |
| Nalcoag 2326 sol (14.5% SiO$_2$ of 5 nm size in water) (gms) | 2. |
| Initial contact angle with water, Φ° | 21° |
| Initial tape adhesion | Pass |
| Tape adhesion after hot water immersion at 65° C., number of days for failure | 20+ |

The above results show that improved adhesion can also be achieved with surface impregnated colloidal silica using colloidal silica free of solvents, such as ethyleneglycol monopropyl ether. The adhesion obtained was greater than 20 days after a hot water immersion at 65° C.

Although the above examples are directed to only a few of the very many variables which can be used in the practice of the method of the present invention as well as the treated thermoplastic substrates obtained therefrom, it should be understood that the present invention is directed to a much broader variety of thermoplastic substrates as well as coating compositions as set forth in the description preceding these examples.

What is claimed is:

1. A substantially transparent thermoplastic substrate exhibiting improved water wetting and water spreading characteristics resulting from the treatment of the thermoplastic substrate by coating with a solvent blend composition having from 1% to 10% by weight of solids, allowing the treated substrate to air dry followed by heat drying the substrate at a temperature in the range of 90° C. to 130° C., where the solids in the solvent blend composition consists essentially of by weight from 3 to 50 parts of polymethylmethacrylate, per 100 parts of a colloidal inorganic oxide.

2. A substantially transparent thermoplastic structured sheet in accordance with claim 1.

3. A substantially transparent polycarbonate sheet in accordance with claim 1.

4. A substantially transparent polymethylmethacrylate sheet in accordance with claim 1.

5. A substantially transparent thermoplastic sheet in accordance with claim 1 having an inorganic oxide methacrylate coating with a thickness of about 0.01 micron to about 1 micron.

6. A substantially transparent thermoplastic sheet in accordance with claim 1 which was solvent impregnated with a solvent blend of diacetone alcohol and colloidal silica.

7. A substantially transparent thermoplastic film in accordance with claim 1.

8. A substantially transparent thermoplastic sheet in accordance with claim 1 which is treated with a solvent blend of polymethylmethacrylate resin and colloidal silica.

9. A substantially transparent thermoplastic sheet in accordance with claim 1 where the colloidal inorganic oxide is colloidal silica.

10. A substantially transparent thermoplastic sheet in accordance with claim 1 where the organic solvent is a mixture of glycol and glycol ether.

11. A substantially transparent thermoplastic sheet in accordance with claim 1 where the organic solvent is a mixture of diacetone alcohol and glycol ether.

12. A substantially transparent thermoplastic substrate exhibiting improved water wetting and water spreading characteristics in accordance with claim 1, where the solvent blend composition consists essentially of 0.1 to 2 parts by weight of a colloidal inorganic oxide per, 100 parts of organic solvent.

* * * * *

UNITED STATES PATENT AND TRADEMARK OFFICE
CERTIFICATE OF CORRECTION

PATENT NO. : 4,994,318
DATED : February 19, 1991
INVENTOR(S) : Gautam A. Patel

It is certified that error appears in the above-identified patent and that said Letters Patent is hereby corrected as shown below:

Column 1, line 35, cancel the following:

convenient

Column 6, line 45, after "a", insert the following:

--contact angle of 27° on Lexan sheet.--

Column 5, line 49, cancel "165°C" and substitute -- 65°C --

Signed and Sealed this

Twenty-first Day of July, 1992

Attest:

DOUGLAS B. COMER

Attesting Officer      Acting Commissioner of Patents and Trademarks